INVENTOR
HERBERT N. WAYNE
BY Hazard & Miller
ATTORNEYS

UNITED STATES PATENT OFFICE.

HERBERT N. WAYNE, OF LOS ANGELES, CALIFORNIA, ASSIGNOR TO WILLIAM J. ENNIS. OF LOS ANGELES, CALIFORNIA.

TIRE.

1,235,861.  Specification of Letters Patent.  Patented Aug. 7, 1917.

Application filed December 27, 1916. Serial No. 139,179.

*To all whom it may concern:*

Be it known that I, HERBERT N. WAYNE, a citizen of the United States, residing at Los Angeles, in the county of Los Angeles and State of California, have invented new and useful Improvements in Tires, of which the following is a specification.

This invention relates to a pneumatic tire and particularly pertains to a tire casing therefor.

The manufacturers of pneumatic tire casings have found that it is desirable to protect the tire tubes from excessive heat due to the frictional engagement of the tread with the ground and to protect the cotton. This has been accomplished in various ways and a class of tires has appeared upon the market which are formed with a carcass made of asbestos fabric. This carcass, while providing suitable heat insulation for the tire, has been either too costly of construction or has not produced a casing construction of satisfactory strength and it is the principal object of this invention to provide a tire casing having a carcass formed of layers of heat insulating material, as well as layers of other material or fabric which will lend strength and economy to the tire and at the same time will provide means for satisfactorily and effectively insulating the tire tubing and carcass against heat; also to provide an insulating layer or layers protecting the carcass from being injuriously affected by the heat used in vulcanizing the repairs or re-tread in injured or worn tires.

It is another object of this invention to protect the carcass from moisture attacking the cotton fabric through abrasions or stone surface cuts, a fruitful source of danger to all cotton fabric tires.

Other objects will appear hereinafter.

The invention is illustrated, by way of example, in the accompanying drawings in which.

Figure 1:
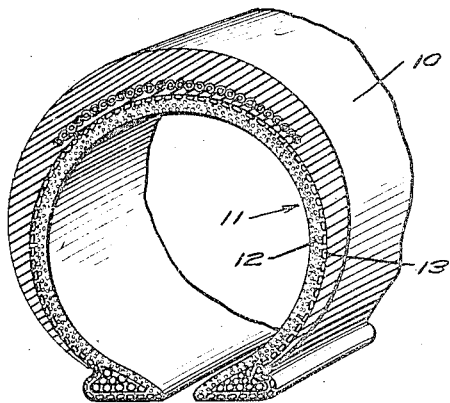
Figure 1 is a view in perspective and transverse section through a tire casing constructed according to the spirit of the present invention.

Referring more particularly to the drawings, 10 indicates the rubber outer tread of a tire casing which is provided to inclose and be supported upon a tire carcass 11. The carcass shown in Fig. 1 of the drawings is composed of a series of layers of tire fabric preferably formed of cotton 12 which form the main body or inner wall of the carcass and which are covered by a layer of heat and moisture resistant or insulating fabric 13, preferably formed of asbestos. The layers of cotton and asbestos fabric have been previously impregnated with rubber which is preferably applied by the friction process and in a manner to form a homogeneous tire carcass composed of two or more classes of material.

Figure 2:
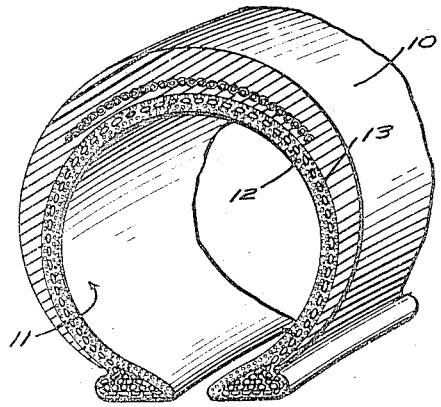
Fig. 2 is a view similar to Fig. 1 illustrating a tire casing having a carcass formed of layers of cotton and asbestos fabric arranged with layers of asbestos between layers of woven cotton tire fabric.
Figure 3:
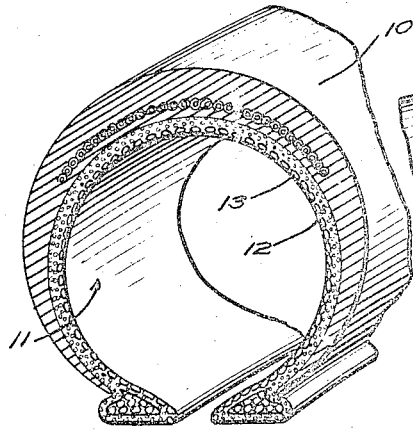
Fig. 3 is a view similar to the preceding views showing the layer of asbestos as positioned adjacent the inner wall of the casing and adapted to bear upon the tire tubing.
Figure 4:
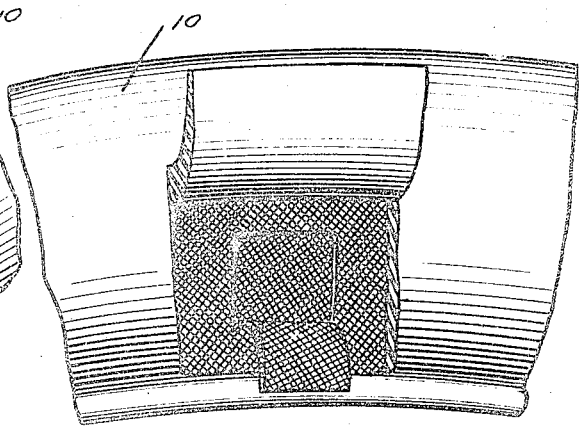
Fig. 4 is a fragmentary view in side elevation illustrating a tire casing with its constructive elements dissected in order to show the manner in which they are preferably arranged in relation to each other.

In the other forms of the invention disclosed in Figs. 2 and 3 of the drawings, illustration is made of carcass fabrics which are arranged with the heat and moisture insulating layer between and within the carcass fabric as separately disclosed. It is also evident that other systems of lamination might be alternately employed in the arrangement of the various tire fabrics and that also there might be a multiplicity of layers of asbestos fabric used without departing from the spirit of the invention.

Whereas the strength of cotton fabric is seriously affected by the extraction of all the moisture which it normally contains; and since moisture is an effectual hindrance to the perfect adhesion of rubber thereto, therefore a compromise must be made by leaving a small percentage of moisture in the cotton to preserve its strength, thereby reducing the adhesive qualities of the rubber friction stock. Asbestos fabric, on the contrary, is not affected by the drying process, hence can receive the full benefit of the adhesive qualities of the rubber friction stock by being thoroughly dried before being "frictioned." This perfect adhesion between the asbestos fabric and the rubber is a preventive against tread separation—one of the most serious defects of ordinary tires.

It may also be stated that asbestos and rubber combine more readily because asbestos is a mineral and is commonly used, in its powdered state, as one of the ingredients in rubber compounding.

The purpose of my protecting layer of asbestos fabric is to preserve the cotton fabric body from some of the injurious effects of heat and moisture, also to create a better and stronger bond between the fabric body and the tread portion of the tire.

It will thus be seen that the tire casing here provided affords a strong and durable carcass and also insures that the tire may be repaired and revulcanized repeatedly without serious injury to the reinforcing carcass fabric or to the tubing incased therein, but will be beneficially insulated from the heat necessarily used for vulcanization or from the heat generated while the tire is in actual service, also from the usual deleterious effects of moisture entering surface cuts or stone bruises and penetrating to and deteriorating the cotton fabric.

I claim:

1. A tire casing comprising an outer rubber tread portion and an inner carcass portion vulcanized thereto, said carcass portion consisting of inner layers of reinforcing cotton fabric and an outer heat insulating fabric.

2. A tire casing comprising an outer rubber tread portion and an inner carcass portion vulcanized thereto, said carcass portion consisting of inner layers of reinforcing cotton fabric and an outer heat insulating asbestos fabric.

3. A tire casing comprising an outer rubber tread portion and an inner carcass portion vulcanized thereto, said carcass portion consisting of inner layers of reinforcing cotton fabric and an outer heat insulating asbestos fabric immediately adjacent thereto.

4. A tire casing comprising a carcass or body portion composed of reinforcing cotton fabric treated with rubber friction stock, a protecting layer of asbestos fabric also treated with a suitable rubber friction stock and placed outside of and adjacent to the said frictioned cotton fabric, an open-weave fabric breaker-strip embedded in a suitable rubber cushion stock and placed around the outer periphery of said dual fabric carcass, a rubber tread portion outside of and encircling the completed carcass, the whole being vulcanized together, thus forming a standard fabric tire casing but having a protecting layer of asbestos fabric between the tread portion and the cotton fabric body.

In testimony whereof I have signed my name to this specification.

HERBERT N. WAYNE.